United States Patent
Savekar et al.

(10) Patent No.: US 8,077,778 B2
(45) Date of Patent: Dec. 13, 2011

(54) VIDEO DISPLAY AND DECODE UTILIZING OFF-CHIP PROCESSOR AND DRAM

(75) Inventors: Santosh Savekar, Karnataka (IN); Moovaraivendren Subramanian, Kanataka (IN)

(73) Assignee: Broadcom Corporation, Irvine, CA (US)

(*) Notice: Subject to any disclaimer, the term of this patent is extended or adjusted under 35 U.S.C. 154(b) by 1827 days.

(21) Appl. No.: 10/725,974

(22) Filed: Dec. 2, 2003

(65) Prior Publication Data
US 2005/0093884 A1 May 5, 2005

Related U.S. Application Data

(60) Provisional application No. 60/516,490, filed on Oct. 31, 2003.

(51) Int. Cl.
*H04N 7/12* (2006.01)
(52) U.S. Cl. ......... 375/240.25; 375/240.02; 375/240.26; 375/240; 375/250
(58) Field of Classification Search .................. 345/619, 345/502, 537, 547, 558, 531, 530, 555; 382/232; 348/445, 556
See application file for complete search history.

(56) References Cited

U.S. PATENT DOCUMENTS

| | | | | |
|---|---|---|---|---|
| 5,874,995 A * | 2/1999 | Naimpally et al. | ...... | 375/240.25 |
| 5,914,711 A * | 6/1999 | Mangerson et al. | .......... | 345/547 |
| 5,977,997 A * | 11/1999 | Vainsencher | .................. | 345/519 |
| 6,088,047 A * | 7/2000 | Bose et al. | ...................... | 345/547 |
| 6,256,045 B1 * | 7/2001 | Bae et al. | ...................... | 348/445 |
| 6,614,441 B1 * | 9/2003 | Jiang et al. | ..................... | 345/539 |
| 6,628,719 B1 * | 9/2003 | Kono et al. | ............. | 375/240.28 |
| 7,133,046 B2 * | 11/2006 | Savekar et al. | ............... | 345/502 |
| 7,142,776 B2 * | 11/2006 | Tada | ............................... | 386/68 |
| 2001/0005398 A1* | 6/2001 | Kono et al. | ............. | 375/240.25 |
| 2002/0001458 A1* | 1/2002 | Abelard et al. | ............... | 386/111 |
| 2003/0169815 A1* | 9/2003 | Aggarwal et al. | ......... | 375/240.12 |
| 2004/0258160 A1* | 12/2004 | Bhatia | ...................... | 375/240.25 |
| 2004/0264924 A1* | 12/2004 | Campisano et al. | ............ | 386/68 |
| 2005/0169368 A1* | 8/2005 | Setoguchi et al. | ....... | 375/240.02 |
| 2007/0153133 A1* | 7/2007 | Xiang et al. | .................. | 348/714 |

* cited by examiner

*Primary Examiner* — Shuwang Liu
*Assistant Examiner* — Helene Tayong
(74) *Attorney, Agent, or Firm* — Thomas, Kayden, Horstemeyer & Risley, LLP

(57) ABSTRACT

A system, method, and apparatus for decoding and displaying images utilizing two processors and two memory units. The decode process receives images which are encoded according to a predetermined standard. Included with the encoded images are parameters which facilitate the decode and display processes. The decode process decodes the encoded images and the encoded parameters and stores each image in a separate image buffer, and each set of associated parameters in a buffer descriptor structure associated with the image buffer. The decode process is carried on by the first processor. The display process utilizes the parameters associated with the image to determine the appropriate display order for each image, and then display the image accordingly on a display device, based on the associated parameters. The first processor carries on the display of the image on the display device. The second processor determines the display order for the images. The second processor and the second memory can be off-chip.

17 Claims, 5 Drawing Sheets

VIDEO DISPLAY AND DECODE UTILIZING OFF-CHIP PROCESSOR AND DRAM

RELATED APPLICATIONS

This application claims priority to Provisional Patent Application Ser. No. 60/516,490, "VIDEO DISPLAY AND DECODE UTILIZING OFF-CHIP PROCESSOR AND DRAM", filed Oct. 31, 2003, by Savekar, et. al., which incorporated herein by reference. This application is related to "System, method, and apparatus for display manager" by Savekar, filed Dec. 2, 2003, which issued as U.S. Patent No. 7,133,046, on Nov. 7, 2006, which claims priority to U.S. Provisional Application Ser. No. 60/516,387, filed Oct. 31, 2003, entitled "System, Method, and apparatus for Display Manager", by Savekar, and "Buffer Descriptor Structures for Communication Between Decoder and Display Manager" Application Ser. No. 10/914,808, (now Publication No. 2005-0093885), filed Aug. 10, 2004, by Savekar.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Video decoders decode a video bit-stream encoded according to a predetermined standard syntax, such as MPEG-2 or Advanced Video Compression (AVC). An encoder generating a compressed video bit-stream makes a number of choices for converting the video stream into a compressed video bit-stream that satisfies the quality of service and bit-rate requirements of a channel and media. However, decoders have limited choices while decoding the compressed bit stream. The decoder uses the decisions made by the encoder to decode and present pictures at the output screen with the correct frame rate at the correct times, and the correct spatial resolution.

Decoding can be partitioned into two processes—the decode process and the display process. The decode process parses through the incoming bit stream and decodes the bit stream to produce decoded images which contain raw pixel data. The display process displays the decoded images onto an output screen at the proper time and at the correct and appropriate spatial and temporal resolutions as indicated in the display parameters received with the stream.

The decoding and display processes are usually implemented as firmware in Synchronous Random Access Memory (SRAM) executed by a processor. The processor is often customized and proprietary, and embedded. This is advantageous because the decoding process and many parts of the displaying process are very hardware-dependent. A customized and proprietary processor alleviates many of the constraints imposed by an off-the-shelf processor. Additionally, the decoding process is computationally intense. The speed afforded by a customized proprietary processor executing instructions from SRAM is a tremendous advantage. The drawbacks of using a customized proprietary processor and SRAM are that the SRAM is expensive and occupies a large area in an integrated circuit. Additionally, the use of proprietary and customized processor complicates debugging. The software for selecting the appropriate frame for display has been found, empirically, to be one of the most error-prone processes. Debugging of firmware for a customized and proprietary processor is complicated because few debugging tools are likely to exist, as compared to an off-the-shelf processor.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be seen in a method for displaying images using a circuit in a system that comprises a decoder for decoding encoded images and parameters associated with the images; image buffers for storing the decoded images; parameter buffers for storing the decoded parameters associated with the decoded images; a display manager for determining when to overwrite an existing image in the image buffers, and providing a signal to the decoder indicating when to overwrite the existing image in the frame buffer; and wherein the decoder overwrites the existing image after receiving the signal. The system further comprises a first processor and a second processor, and a first memory and a second memory.

The circuit comprises a first processor; and a first memory connected to the processor, the first memory storing instructions, wherein execution of the instructions by the first processor causes decoding images, and overwriting an existing image after the processor receives a signal indicating when to overwrite the existing image. The circuit further comprises a second processor connected to the integrated circuit; and a second memory connected to the processor, the second memory storing instructions, wherein execution of the instructions by the second processor causes determining when to overwrite the existing frame, and transmitting the signal to the first processor indicating when to overwrite the existing frame.

The method for displaying images comprises decoding images; decoding parameters associated with the images; overwriting an existing buffered decoded image; and displaying the decoded images.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1A:
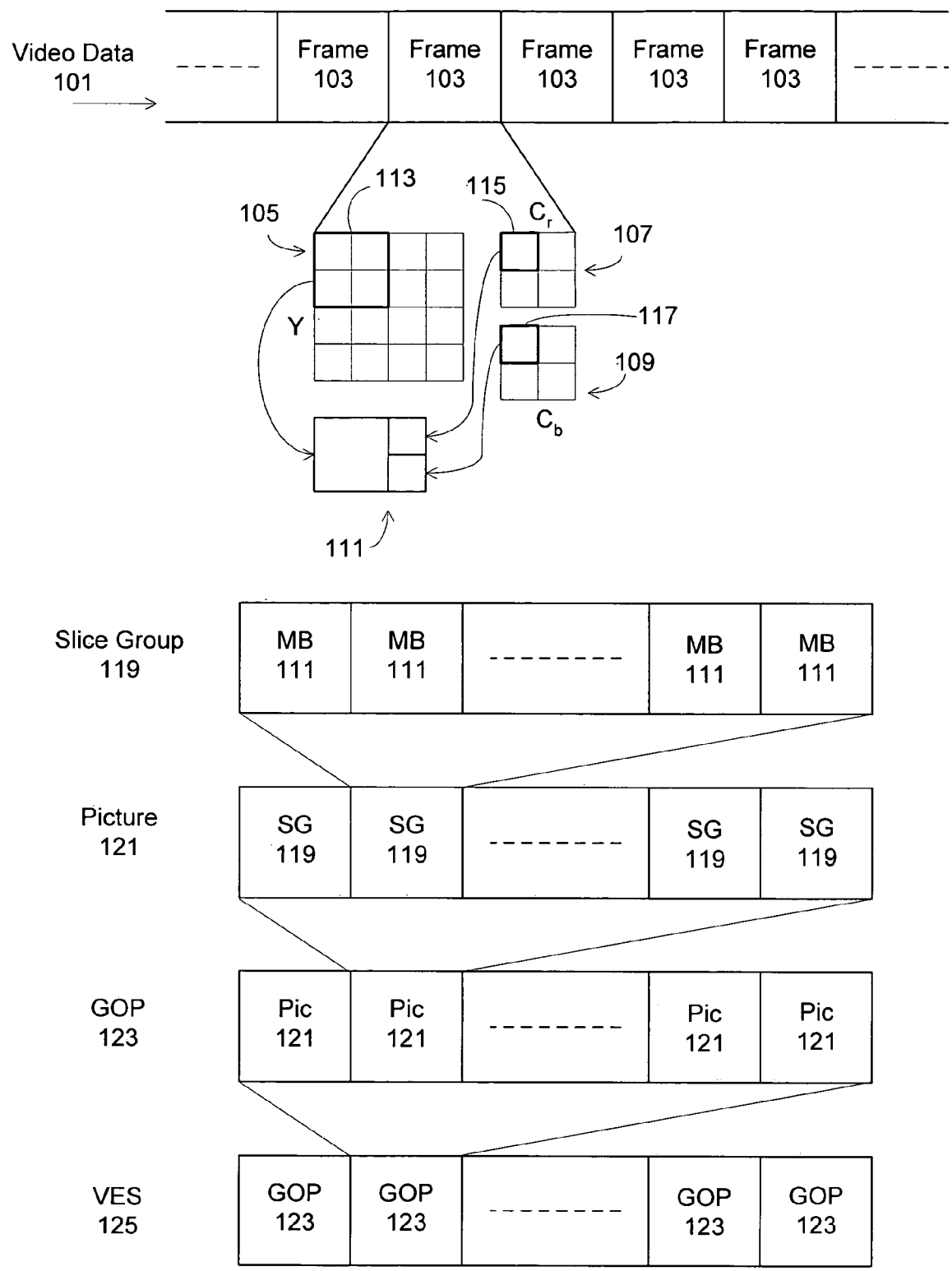
FIG. 1a illustrates a block diagram of an exemplary Moving Picture Experts Group (MPEG) encoding process, in accordance with an embodiment of the present invention.

FIG. 1a illustrates a block diagram of an exemplary Moving Picture Experts Group (MPEG) encoding process of video data 101, in accordance with an embodiment of the present invention. The video data 101 comprises a series of frames 103. Each frame 103 comprises two-dimensional grids of luminance Y, 105, chrominance red $C_r$, 107, and chrominance blue $C_b$, 109, pixels.

Figure 1B:
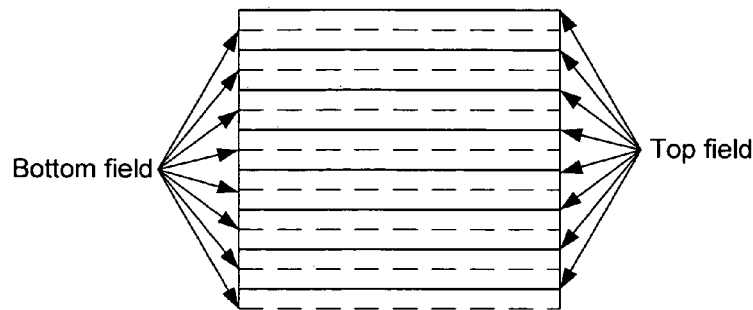
FIG. 1b illustrates an exemplary interlaced frame.

FIG. 1b is an illustration of a frame 103. A frame 103 can either be captured as an interlaced frame or as a progressive frame. In an interlaced frame 103, the even-numbered lines are captured during one time interval, while the odd-numbered lines are captured during an adjacent time interval. The even-numbered lines form the top field, while the odd-numbered lines form the bottom field of the interlaced frame.

Similarly, a display device can display a frame in progressive format or in interlaced format. A progressive display displays the lines of a frame sequentially, while an interlaced display displays one field followed by the other field. In a special case, a progressive frame can be displayed on an interlaced display by displaying the even-numbered lines of the progressive frame followed by the odd-numbered lines, or vice versa.

Referring again to FIG. 1a, the two-dimensional grids are divided into 8×8 blocks, where a group of four blocks or a 16×16 block 113 of luminance pixels Y is associated with a block 115 of chrominance red $C_r$, and a block 117 of chrominance blue $C_b$ pixels. The block 113 of luminance pixels Y, along with its corresponding block 115 of chrominance red pixels $C_r$, and block 117 of chrominance blue pixels $C_b$ form a data structure known as a macroblock 111. The macroblock 111 also includes additional parameters, including motion vectors, explained hereinafter. Each macroblock ill represents image data in a 16×16 block area of the image.

The data in the macroblocks 111 is compressed in accordance with algorithms that take advantage of temporal and spatial redundancies. For example, in a motion picture, neighboring frames 103 usually have many similarities. Motion causes an increase in the differences between frames, the difference being between corresponding pixels of the frames, which necessitate utilizing large values for the transformation from one frame to another. The differences between the frames may be reduced using motion compensation, such that the transformation from frame to frame is minimized. The idea of motion compensation is based on the fact that when an object moves across a screen, the object may appear in different positions in different frames, but the object itself does not change substantially in appearance, in the sense that the pixels comprising the object have very close values, if not the same, regardless of their position within the frame. Measuring and recording the motion as a vector can reduce the picture differences. The vector can be used during decoding to shift a macroblock 111 of one frame to the appropriate part of another frame, thus creating movement of the object. Hence, instead of encoding the new value for each pixel, a block of pixels can be grouped, and the motion vector, which determines the position of that block of pixels in another frame, is encoded.

Accordingly, most of the macroblocks 111 are compared to portions of other frames 103 (reference frames). When an appropriate (most similar, i.e. containing the same object(s)) portion of a reference frame 103 is found, the differences between the portion of the reference frame 103 and the macroblock 111 are encoded. The location of the portion in the reference frame 103 is recorded as a motion vector. The encoded difference and the motion vector form part of the data structure encoding the macroblock 111. In the MPEG-2 standard, the macroblocks 111 from one frame 103 (a predicted frame) are limited to prediction from portions of no more than two reference frames 103. It is noted that frames 103 used as a reference frame for a predicted frame 103 can be a predicted frame 103 from another reference frame 103.

The macroblocks 111 representing a frame are grouped into different slice groups 119. The slice group 119 includes the macroblocks 111, as well as additional parameters describing the slice group. Each of the slice groups 119 forming the frame form the data portion of a picture structure 121. The picture 121 includes the slice groups 119 as well as additional parameters that further define the picture 121.

Figure 1C:
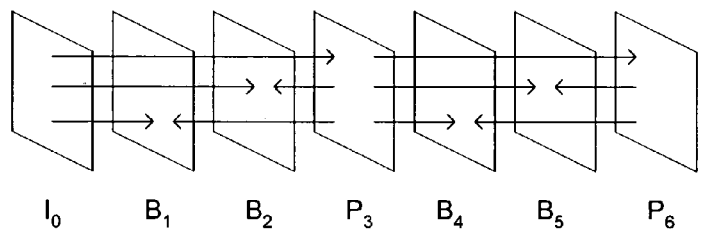
FIG. 1c illustrates an exemplary sequence of frames in display order, in accordance with an embodiment of the present invention.

$I_0$, $B_1$, $B_2$, $P_3$, $B_4$, $B_5$, and $P_6$, FIG. 1c, are exemplary pictures representing frames. The arrows illustrate the temporal prediction dependence of each picture. For example, picture $B_2$ is dependent on reference pictures $I_0$, and $P_3$. Pictures coded using temporal redundancy with respect to exclusively earlier pictures of the video sequence are known as predicted pictures (or P-pictures), for example picture $P_3$ is coded using reference picture $I_0$. Pictures coded using temporal redundancy with respect to earlier and/or later pictures of the video sequence are known as bi-directional pictures (or B-pictures), for example, pictures $B_1$ is coded using pictures $I_0$ and $P_3$. Pictures not coded using temporal redundancy are known as I-pictures, for example $I_0$. In the MPEG-2 standard, I-pictures and P-pictures are also referred to as reference pictures.

Figure 1D:
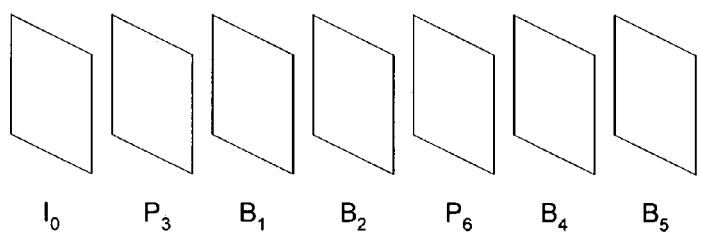
FIG. 1d illustrates an exemplary sequence of frames in decode order, in accordance with an embodiment of the present invention.

The foregoing data dependency among the pictures requires decoding of certain pictures prior to others. Additionally, the use of later pictures as reference pictures for previous pictures requires that the later picture is decoded prior to the previous picture. As a result, the pictures cannot be decoded in temporal display order, i.e. the pictures may be decoded in a different order than the order in which they will be displayed on the screen. Accordingly, the pictures are transmitted in data dependent order, and the decoder reorders the pictures for presentation after decoding. $I_0$, $P_3$, $B_1$, $B_2$, $P_6$, $B_4$, $B_5$, FIG. 1d, represent the pictures in data dependent and decoding order, different from the display order seen in FIG. 1c.

Referring again to FIG. 1a, the pictures are then grouped together as a group of pictures (GOP) 123. The GOP 123 also includes additional parameters further describing the GOP. Groups of pictures 123 are then stored, forming what is known as a video elementary stream (VES) 125. The VES 125 is then packetized to form a packetized elementary sequence. Each packet is then associated with a transport header, forming what are known as transport packets.

The transport packets can be multiplexed with other transport packets carrying other content, such as another video elementary stream 125 or an audio elementary stream. The multiplexed transport packets form what is known as a transport stream. The transport stream is transmitted over a communication medium for decoding and displaying.

Figure 2:
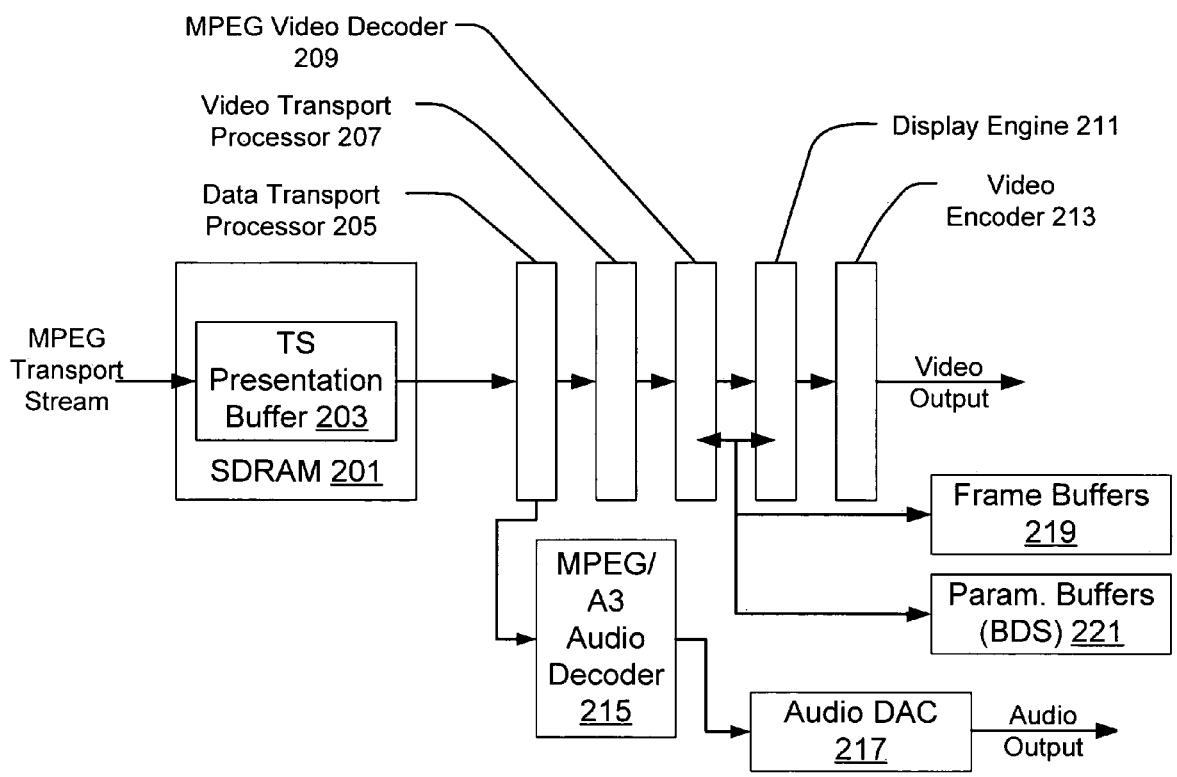
FIG. 2 illustrates a block diagram of an exemplary circuit for decoding the compressed video data, in accordance with an embodiment of the present invention.

FIG. 2 illustrates a block diagram of an exemplary circuit for decoding the compressed video data, in accordance with an embodiment of the present invention. Data is received and stored in a presentation buffer 203 within a Synchronous Dynamic Random Access Memory (SDRAM) 201. The data can be received from either a communication channel or from a local memory, such as, for example, a hard disc or a DVD.

The data output from the presentation buffer 203 is then passed to a data transport processor 205. The data transport processor 205 demultiplexes the transport stream into packetized elementary stream constituents, and passes the audio transport stream to an audio decoder 215 and the video transport stream to a video transport processor 207 and then to a MPEG video decoder 209. The audio data is then sent to the output blocks, and the video is sent to a display engine 211.

The display engine 211 scales the video picture, renders the graphics, and constructs the complete display. Once the display is ready to be presented, it is passed to a video encoder 213 where it is converted to analog video using an internal digital to analog converter (DAC). The digital audio is converted to analog in an audio digital to analog converter (DAC) 217.

The decoder 209 decodes at least one picture, $I_0, B_1, B_2, P_3, B_4, B_5, P_6, \ldots$, during each frame display period, in the absence of Personal Video Recording (PVR) modes when live decoding is turned on. Due to the presence of the B-pictures, $B_1, B_2$, the decoder 209 decodes the pictures, $I_0, B_1, B_2, P_3, B_4, B_5, P_6, \ldots$ in an order that is different from the display order. The decoder 209 decodes each of the reference pictures, e.g., $I_0, P_3$, prior to each picture that is predicted from the reference picture. For example, the decoder 209 decodes $I_0, B_1, B_2, P_3$, in the order, $I_0, P_3, B_1$, and $B_2$. After decoding $I_0$ and $P_3$, the decoder 209 applies the offsets and displacements stored in $B_1$ and $B_2$, to the decoded $I_0$ and $P_3$, to decode $B_1$ and $B_2$. In order to apply the offset contained in $B_1$ and $B_2$, to the decoded $I_0$ and $P_3$, the decoder 209 stores decoded $I_0$ and $P_3$ in memory known as frame buffers 219. The display engine 211, then displays the decoded images onto a display device, e.g. monitor, television screen, etc., at the proper time and at the correct spatial and temporal resolution.

Since the images are not decoded in the same order in which they are displayed, the display engine 211 lags behind the decoder 209 by a delay time. In some cases the delay time may be constant. Accordingly, the decoded images are buffered in frame buffers 219 so that the display engine 211 displays them at the appropriate time. Accomplishing a correct display time and order, the display engine 211 uses various parameters decoded by the decoder 209 and stored in the parameter buffer 221, also referred to as Buffer Descriptor Structure (BDS).

A conventional system may utilize one processor to implement the decoder 209 and display engine 211. The decoding and display process are usually implemented as firmware in SRAM executed by a processor. The processor is often customized and proprietary, and embedded. This is advantageous because the decoding process and many parts of the displaying process are very hardware-dependent. A customized and proprietary processor alleviates many of the constraints imposed by an off-the-shelf processor. Additionally, the decoding process is computationally intense. The speed afforded by a customized proprietary processor executing instructions from SRAM is a tremendous advantage. The drawbacks of using a customized proprietary processor and SRAM is that the SRAM is expensive and occupies a large area in an integrated circuit. Additionally, the use of proprietary and customized processor complicates debugging. The software for selecting the appropriate frame for display has been found, empirically, to be one of the most error-prone processes. Debugging of firmware for a customized and proprietary processor is complicated because few debugging tools are likely to exist, as compared to an off-the-shelf processor.

The functionality of the decoder and display unit can be divided into three functions. One of the functions can be decoding the frames, another function can be displaying the frames, and another function can be determining the order in which decoded frames are displayed. The function for determining the order in which decoded frames are displayed can be off-loaded from the customized proprietary processor and implemented as firmware in DRAM that is executed by a more generic, "off-the-shelf" processor, such as, but not limited to, a MIPS processor or a RISC processor. The foregoing is advantageous because by offloading the firmware for selecting the frame for display from the SRAM, less space on an integrated circuit is consumed. Additionally, empirically, the process for selecting the image for display has been found to consume the greatest amount of time for debugging. By implementing the foregoing as firmware executed by an "off-the-shelf" processor, more debugging tools are available. Accordingly, the amount of time for debugging can be reduced.

Figure 3:
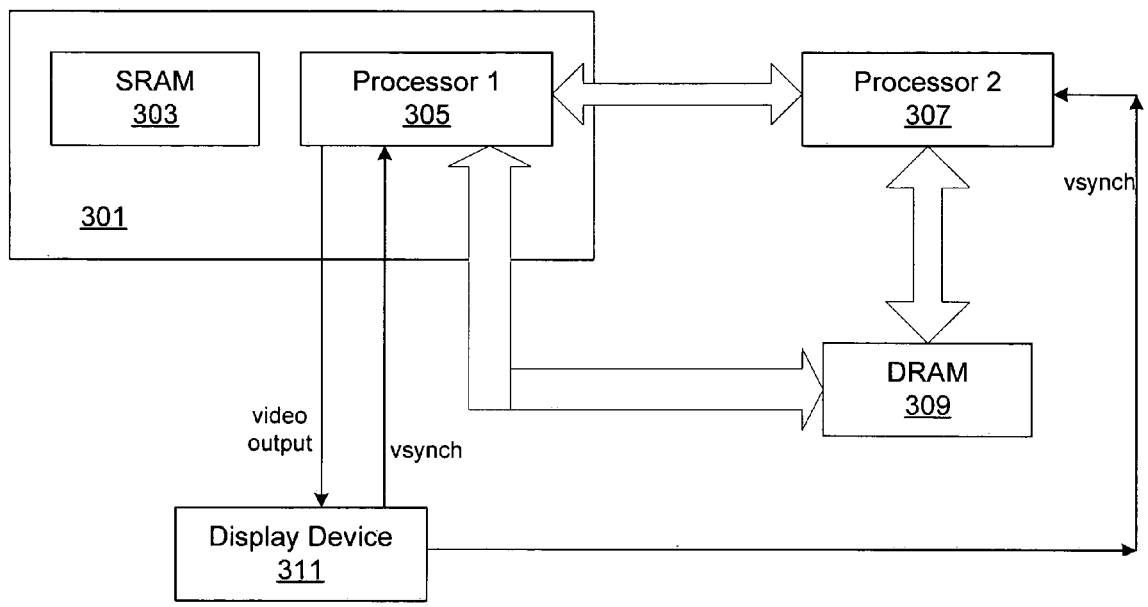
FIG. 3 illustrates a block diagram of an exemplary decoder and display engine unit for decoding and displaying video data, in accordance with an embodiment of the present invention.

Referring now to FIG. 3, there is illustrated a block diagram of the decoder system in accordance with an embodiment of the present invention. The second processor 307 oversees the process of selecting a decoded frame from the DRAM 309 for display and notifies the first processor 305 of the selected frame. The second processor 307 executes code that is also stored in the DRAM 309. The second processor 307 may comprise an "off-the-shelf" processor, such as a MIPS or RISC processor. The DRAM 309 and the second processor 307 can be off-chip. The system comprises a first processor 305, a first memory unit (SRAM) 303, a second processor 307, and a second memory unit (DRAM) 309.

The first processor 305 oversees the process of decoding the frames of the video frames, and displaying the video images on a display device 311. Alternatively, displaying the video images on a display device can also be offloaded to the second processor. The first processor 305 may run code that may be stored in the SRAM 303. The first processor 305 and the SRAM 303 are on-chip devices, thus inaccessible by a user, which is ideal for ensuring that important, permanent, and proprietary code cannot be altered by a user. The first processor 305 decodes the frames and stores the decoded frames in the DRAM 309.

The process of decoding and display of the frames can be implemented as firmware executed by one processor while the process for selecting the appropriate frame for display can be implemented as firmware executed by another processor. Because the decoding and display processes are relatively hardware-dependent, the decoding and display processes can be executed in a customized and proprietary processor. The firmware for the decoding and display processes can be implemented in SRAM.

On the other hand, the process for selecting the frame for display can be implemented as firmware in DRAM that is executed by a more generic, "off-the-shelf" processor, such as, but not limited to, a MIPS processor or a RISC processor. The foregoing is advantageous because by offloading the firmware for selecting the frame for display from the SRAM, less space on an integrated circuit is consumed. Additionally, empirically, the process for selecting the image for display has been found to consume the greatest amount of time for debugging. By implementing the foregoing as firmware executed by an "off-the-shelf" processor, more debugging tools are available. Accordingly, the amount of time for debugging can be reduced.

Figure 4B:
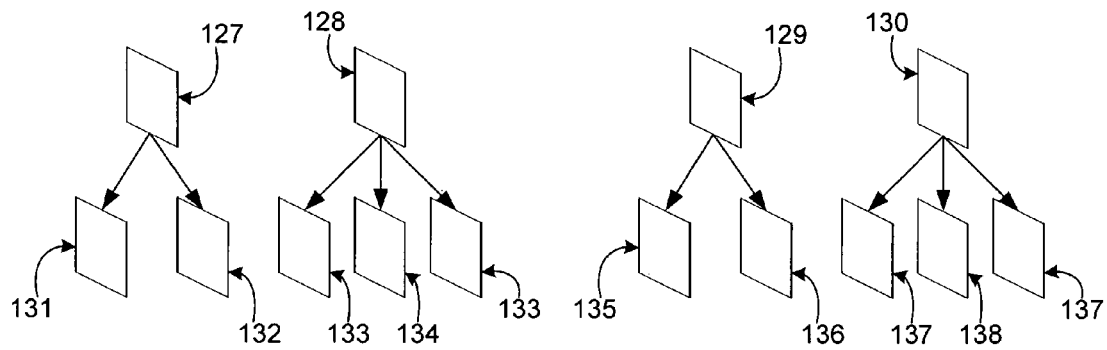
FIG. 4b illustrates an exemplary 3:2 pulldown technique.
Figure 4A:
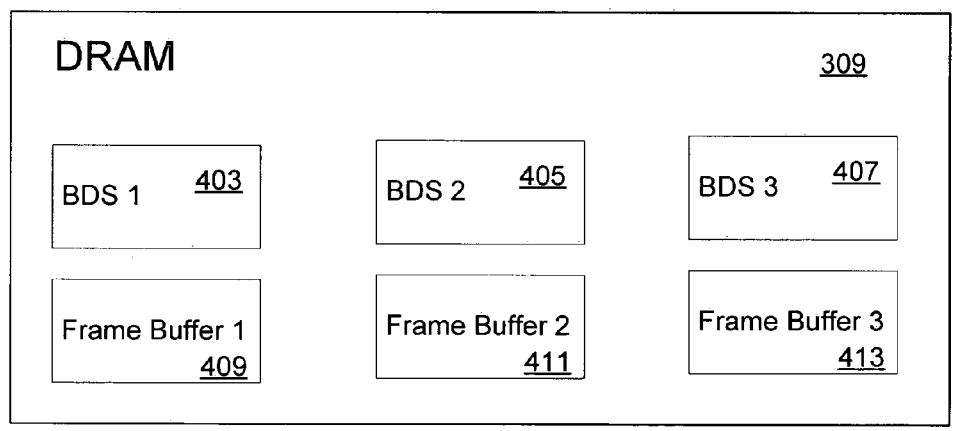
FIG. 4a illustrates a dynamic random access memory (DRAM) unit, in accordance with an embodiment of the present invention.

FIG. 4a illustrates a dynamic random access memory (DRAM) unit 309, in accordance with an embodiment of the present invention. The DRAM 309 may contain frame buffers 409, 411 and 413 and corresponding parameter buffers for the BDSs, 403, 405 and 407.

In one embodiment of the present invention, the video data is provided to the processor 305. The display device 311 sends a vertical synchronization (vsynch) signal every time it is finished displaying a frame. When a vsynch is sent, the processor 305 may decode the next frame in the decoding sequence, which may be different from the display sequence as explained hereinabove. Since the second processor is an "off-the-shelf" processor, real time responsiveness of the second processor cannot be guaranteed. To allow the second processor 307 more time to select the frame for display, it is preferable that the second processor 307 selects the frame for display at the next vsynch, responsive to the present vsynch. Accordingly, after the vsynch, the first processor 305 loads parameters for the next decoded frame into the BDS. The second processor 307 can determine the next frame for display, by examining the BDS for all of the frame buffers. This decision can be made prior to the decoding of the next decoded frame, thereby allowing the second processor 307 a window of almost one display period prior to the next vsynch for determining the frame for display, thereat. The decoded frame is then stored in the appropriate buffer.

The processor 307 notifies the processor 305 of the decision regarding which frame should be displayed next. When the display device 311 sends the next vsynch signal, the foregoing is repeated and the processor 305 displays the frame that was determined by processor 307 prior to the latest vsynch signal. The process of displaying the frame selected by the second processor prior to the latest vsynch may also be implemented utilizing the second processor. Consequently, the first processor may not need to interface with the display hardware and may work based only on the vsynchs and the signals for determining which frame to overwrite from the second processor. The processor 305 gets the frame to display and its BDS from the DRAM 309, applies the appropriate display parameters to the frame and sends it for display on the display device 311.

The frame buffers 409, 411, and 413 in the DRAM 309 may have limited storage space, therefore, when a new frame is sent from the first processor 305, if the frame buffer where the decoded frame will be stored contains data that is not required by the display process in the second processor and the data is not needed for any predictions, that older frame would be overwritten. In one embodiment of the present invention, there may be three frame buffers in the DRAM 309, corresponding to each of the three frame types, I, P and B pictures.

In MPEG-2 two I or P frames at a time, because two I or P frames (reference frames) are used to decode B frames. Accordingly, the two most recently decoded I or P frames are stored in two of the frame buffers. When a new I or P decoded frame is sent by the first processor 305 to be stored in the DRAM 309, the oldest I or P decoded frame may be overwritten.

When a B frame is decoded, the B frame stored in the frame buffer is overwritten. However, it is possible that while the decoded B frame is decoded, the B frame stored in the frame buffer is being displayed. This occurs when two consecutive B frames are displayed. Waiting to decode the B frame until after the entire B frame in the frame buffer has been displayed may not allow enough time to decode the new B frame before display time. Accordingly, the decode B frame is decoded in portions as portions of the display B frame are displayed. After a portion of the display B frame is displayed, a corresponding portion of the decode B frame is decoded and the displayed portion of the displayed B frame is overwritten with the decoded portion of the decode B frame. The foregoing can be done provided that the overwritten portion of the display B frame is no longer needed, i.e. is being displayed for the last time.

There are cases however, where a display B frame may be scanned again, such as, for example, when the 3:2 pulldown technique is utilized. Referring now to FIG. 4b, there is illustrated a block diagram describing the display of frames using the 3:2 pulldown technique. The 3:2 pulldown technique is used to convert video data in the film mode standard frame rate for display in the NTSC (National Television System Committee) standard frame rate. Video data in the film mode standard frame rate comprises 24 progressive frames per second. An NTSC display, however, displays 30 interlaced frames per second, or 60 fields per second. The video data in the film mode standard is displayed on an NTSC display by displaying five fields for every two progressive frames. For one frame 127 the top field 131 is displayed, followed by the bottom field 132, then the top field 133 from the following frame 128 is displayed, followed by the second frame's bottom field 134, then the top field 133, as illustrated in FIG. 4b. For the subsequent two frames, 129 and 130, the bottom field 135 of the frame 129 is displayed, followed by the top field 136 of frame 129, followed by the bottom field 137 of frame 130, followed by the top field 138 of frame 130, and followed by the bottom field 137, again. If the B frame is displayed for two field periods, then replacing the B frame in the frame buffer can start as soon as the second field frame starts displaying. However, if the B frame needs to be displayed for three field periods, the video decoder waits until till the field that is displayed first, is being displayed a second time to start overwriting the B frame in the frame buffer. Other examples where B frames are scanned more than once are associated with PVR.

Figure 5:
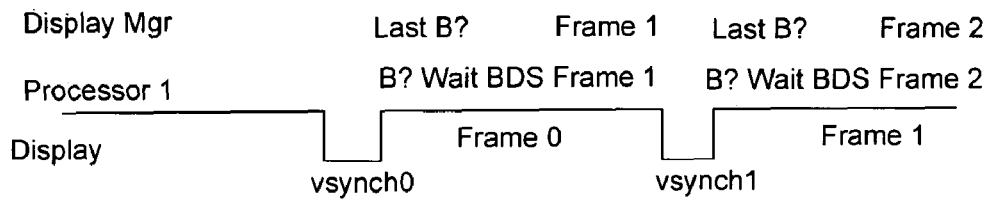
FIG. 5 illustrates a timing diagram of the decoding and displaying process, in accordance with an embodiment of the present invention.
Figure 5:
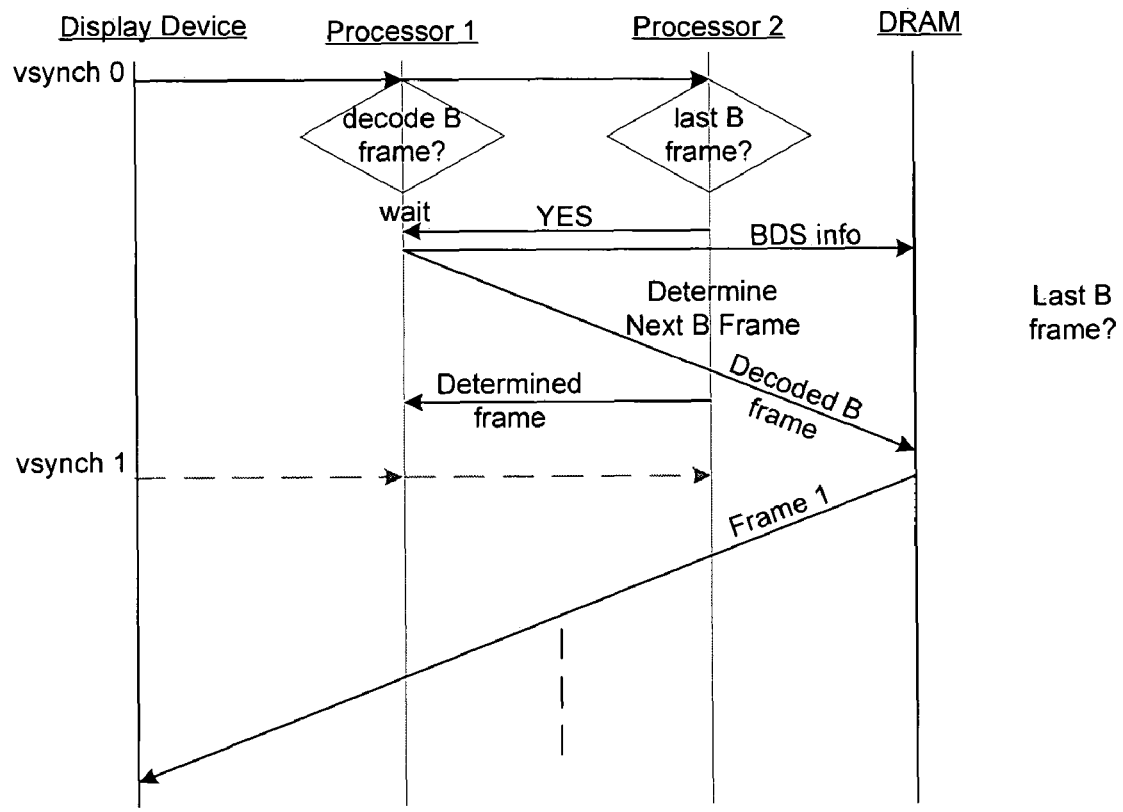

FIG. 5 illustrates a timing diagram of the decoding and displaying process, in accordance with an embodiment of the present invention. Processor 307 may be an off-the-shelf generic processor, and it may be off-chip If the first processor 305 were the only processor in the system, the code would only be in SRAM 303, and the processor 305 would be able to process, i.e. decode an image and determine the next image to display during a short period after the vsynch, then display that image during the time before the next vsynch signal. However, that is not desirable in this system since, as mentioned hereinabove, utilizing only the on-chip processor 305 and the SRAM 303 may be more costly than utilizing a second processor 307 and a DRAM 309. The second processor 307 and the DRAM 309 may be more economical.

When the vsynch occurs, the processor 307 determines the appropriate image to display next according to the correct order. It is desirable to provide processor 307 with the necessary information to determine the next frame for display early, to afford the processor 307 more time to determine the next frame for display. As a result, when, for instance, a vsynch 0 occurs, processor 305 and processor 307 are notified. Processor 305 then depending on the next frame to decode does different thing. If the next frame to decode is an I or a P frame, processor 305 may load the BDS information associated with the frame that is being currently decoded onto the DRAM 309 and notifies the processor 307. The processor 307 determines the appropriate frame to display next to maintain the correct order of frames based on the BDS. Meanwhile, the processor 305 also begins displaying the current display frame, e.g. frame 0, and decoding the current decode frame utilizing instructions stored on the SRAM 303. Once the decoding of the current frame is complete, the processor 305 may send the decoded frame to the DRAM 309, and overwrites the oldest I or P frame in the appropriate frame buffer. Processor 305 may overwrite frames in DRAM while the decoding is in progress.

If, however, the next frame to be decoded is a B frame, processor 305 sends a signal to processor 307. The processor 307 then determines whether a B frame is being displayed for the last time, and sends a signal to processor 305. When processor 305 receives the signal that a B frame is being displayed for the last time, processor 305 may load the BDS information associated with the B frame that is being currently decoded onto the DRAM 309. As the B frame is being displayed for the last time, the processor 305 decodes the next B frame and overwrites the B frame that is being currently displayed, as it is being displayed.

Once the processor 307 determines, for instance, frame 1 that needs to be displayed next, processor 307 sends the determination information to processor 305. At vsynch 1, the foregoing is repeated and processor 305 displays the frame selected after vsynch 0, e.g. frame 1, from the DRAM 309.

The embodiments described herein may be implemented as a board level product, as a single chip, application specific integrated circuit (ASIC), or with varying levels of the decoder system integrated with other portions of the system as separate components. The degree of integration of the decoder system will primarily be determined by the speed and cost considerations. Because of the sophisticated nature of modern processor, it is possible to utilize a commercially available processor, which may be implemented external to an ASIC implementation. Alternatively, if the processor is available as an ASIC core or logic block, then the commercially available processor can be implemented as part of an ASIC device wherein certain functions can be implemented in firmware.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for displaying images on a display, said system comprising:
   a decoder for decoding encoded images and parameters associated with the images;
   image buffers for storing the decoded images;
   buffer descriptor structures (BDS) for storing the decoded parameters associated with the decoded images;
   a display manager for determining when to overwrite an existing image in the image buffers, wherein determining when to overwrite the existing image further comprises determining when the existing image has finished display for the last time and is no longer needed for decoding other images, and providing a signal to the decoder indicating when to overwrite the existing image in the image buffer; and
   wherein the decoder overwrites the existing image after receiving the signal; and
   wherein the decoder images are provided for display in the forward order at normal speed; and
   wherein the set of decoded parameters includes a decoded parameter indicating when the system is utilizing a technique requiring selective images to be displayed more than once.

2. The system according to claim 1 wherein the system further comprises:
   a first processor;
   a second processor;
   a first memory;
   a second memory; and
   wherein the first memory stores an instruction set for the decoder.

3. The system according to claim 2 wherein the first processor executes the instruction set for the decoder.

4. The system according to claim 3 wherein the second memory stores an instruction set for the display manager, the instruction set for the display manager executed by the second processor.

5. The system according to claim 4 wherein the second processor determines when to overwrite the existing image.

6. The system according to claim 5 wherein an integrated circuit comprises the first processor and first memory, and wherein the second processor is off-chip from the integrated circuit.

7. The system according to claim 2 wherein the second memory is an off-chip memory.

8. The system according to claim 2 wherein the first memory is a SRAM.

9. The system according to claim 2 wherein the second memory is a DRAM.

10. The system according to claim 2 wherein the second memory stores the image buffers.

11. The system according to claim 2 wherein the second memory stores the parameter buffers.

12. The circuit of claim 1, wherein the display manager determines when to overwrite an existing image in the image buffer based at least in part on at least one of the decoded parameters.

13. The circuit of claim 1, wherein the display manager determine when to overwrite an existing image with another image, wherein the another image and the existing image are from the same video sequence.

14. A circuit for displaying images on a display, said circuit comprising:
   a first processor; and
      a first memory connected to the processor, the first memory storing instructions, wherein execution of the instructions by the first processor causes:
   decoding images; and
      decoding parameters associated with the images and writing them to buffer descriptor structures (BDS);
      overwriting an existing image after the processor receives a signal indicating when to overwrite the existing image; and
      wherein at least some of the images are stored for at least one display period after at least some of the images are displayed; and
      wherein the set of decoded parameters includes a parameter indicating when the circuit is utilizing a technique requiring selective images to be displayed more than once;
      a second processor connected to the circuit; and
      a second memory connected to the second processor, the second memory storing instructions, wherein execution of the instruction by the second processor causes:
   determining when to overwrite the existing frame; and
   transmitting the signal to the first processor indicating when to overwrite the existing frame.

15. The circuit of claim 14, wherein execution of the instructions by the first processor further causes:
   displaying the images.

16. The circuit of claim 14, wherein determining when to overwrite the existing frame further comprises:
  examining some of the decoded parameters associated with the images by the second processor.

17. The circuit of claim 14, further comprising the buffer descriptor structures (BDS) connected to the circuit and the frame buffer connected to the circuit, wherein the buffer descriptor structures (BDS) stores the decoded parameters, and the frame buffer stores the decoded images.

* * * * *